(12) United States Patent
Morris

(10) Patent No.: US 12,543,716 B2
(45) Date of Patent: Feb. 10, 2026

(54) TOP SLOT HOOK CHAMBER FOR SOFT PLASTIC FISHING LURES

(71) Applicant: Joshua W. Morris, Georgetown, TX (US)

(72) Inventor: Joshua W. Morris, Georgetown, TX (US)

(*) Notice: Subject to any disclaimer, the term of this patent is extended or adjusted under 35 U.S.C. 154(b) by 0 days.

(21) Appl. No.: 19/043,452

(22) Filed: Feb. 1, 2025

(65) Prior Publication Data
US 2025/0248381 A1 Aug. 7, 2025

Related U.S. Application Data

(60) Provisional application No. 63/548,802, filed on Feb. 1, 2024.

(51) Int. Cl.
*A01K 85/00* (2006.01)
*A01K 85/16* (2006.01)

(52) U.S. Cl.
CPC .......... *A01K 85/1831* (2022.02); *A01K 85/16* (2013.01)

(58) Field of Classification Search
CPC ........................ A01K 85/1811; A01K 85/1821
USPC ................................................ 43/42.1, 42.24
See application file for complete search history.

(56) References Cited

U.S. PATENT DOCUMENTS

| | | | | |
|---|---|---|---|---|
| 3,724,116 A * | 4/1973 | Lindner | ................ | A01K 85/00 43/44.8 |
| 3,868,784 A * | 3/1975 | Sabol | .................... | A01K 85/16 43/42.3 |
| 5,070,639 A * | 12/1991 | Pippert | .................. | A01K 85/01 43/42.31 |
| 6,266,916 B1 * | 7/2001 | Dugan | ................... | A01K 85/00 43/42.35 |
| 6,718,683 B2 * | 4/2004 | Hawkins | ............... | A01K 85/00 43/42.38 |
| 9,060,499 B2 * | 6/2015 | Roberts | .................. | A01K 85/00 |
| 9,253,966 B2 * | 2/2016 | Scholfield | ............. | A01K 85/01 |
| 9,456,591 B2 * | 10/2016 | Nichols | ................. | A01K 85/02 |
| 10,219,496 B2 * | 3/2019 | Gierlich | ................ | B29C 41/42 |

(Continued)

FOREIGN PATENT DOCUMENTS

| | | | | |
|---|---|---|---|---|
| DE | 202022103676 U1 * | 7/2022 | ............ | A01K 83/06 |
| ES | 2766878 A1 * | 6/2020 | ......... | A01K 85/1833 |

(Continued)

*Primary Examiner* — Christopher P Ellis
(74) *Attorney, Agent, or Firm* — Kearney, McWilliams & Davis, PLLC; William Yarbrough

(57) ABSTRACT

The present invention is a soft plastic lure, constructed of a plastic, semi-plastic or combination "soft" and "hard-soft" plastics, where the "nose" of a lure's head exhibits a solid area of a hook anchor for guidance into an internalized receiving channel, proximate to the lure's dorsal area, with a rearwardly attached chamber tab or tabs, at the rear wall of the channel, which provides guide of a hook from said "nose", into said channel, through an accepting tab, or tabs, wherein the inserted hook is secured where the hook's point is exterior and front-facing. The soft plastic lure is thereby capable, through proper acceptance and placement of a hook, of providing a properly guided and secured hook placement into and within the soft plastic lure ensuring correct placement of the hook and thus correct action, and maximum effectiveness of the soft plastic lure.

17 Claims, 6 Drawing Sheets

(56) References Cited

U.S. PATENT DOCUMENTS

| | | | | |
|---|---|---|---|---|
| 11,337,410 | B2* | 5/2022 | Malooley | A01K 91/04 |
| 12,082,569 | B1* | 9/2024 | Rapelje | A01K 85/1811 |
| 2005/0204607 | A1* | 9/2005 | Nichols | A01K 85/16 |
| | | | | 43/42.39 |
| 2006/0117642 | A1* | 6/2006 | Huddleston | A01K 85/00 |
| | | | | 43/42.39 |
| 2016/0120160 | A1* | 5/2016 | Penn | A01K 85/02 |
| | | | | 43/42.1 |
| 2023/0354791 | A1* | 11/2023 | Guadalupe | A01K 85/1851 |
| 2024/0365763 | A1* | 11/2024 | Goehler | A01K 85/018 |

FOREIGN PATENT DOCUMENTS

| | | | | |
|---|---|---|---|---|
| KR | 20180001557 U | * | 5/2018 | ............. A01K 85/00 |
| KR | 20210013872 A | * | 2/2021 | ............. A01K 85/02 |
| KR | 20250061972 A | * | 5/2025 | ......... A01K 85/1811 |

* cited by examiner

TOP SLOT HOOK CHAMBER FOR SOFT PLASTIC FISHING LURES

CROSS-REFERENCE TO RELATED APPLICATIONS

Provisional Application No. 63/548,802 filed Feb. 1, 2024

FEDERALLY SPONSORED RESEARCH OR DEVELOPMENT

N/A

INCORPORATION BY REFERENCE OF MATERIAL SUBMITTED ON A COMPACT DISK

N/A

FIELD OF THE INVENTION

The present invention relates to an artificial lure, and method of use thereof, exhibiting a slotted cavity feature and stay tab in a soft plastic lure for proper insertion of a "guided" hook, generally. Specifically, the top slot design itself harbors a guiding and securing tab which is capable of accepting different gauge hooks, commensurate with variable lure, tab sizes and channel size, to provide a predetermined pathway for proper insertion, guidance and secured acceptance of a hook for various lure designs in soft plastic.

BACKGROUND

Historically, fishing lures can be made of pliable plastics whereby hooks are forcibly inserted into the body of a "soft" lure, without predetermined guidance or direction, via the introduction of a hook into the head region of a pliable "solid body" lure, through the lure's "body" and exiting the lure at a desired angle and direction. The lure, lacking definite and definitive points of insertion and/or guidance, or any accepting channels, may receive a hook via any one of various pathways which are created solely by force created upon hook insertion. And, where the body of the lure is "solid" and path guidance is non-existent, hooks are introduced through the body of the lure at various and variable angles which are intrinsically unmanageable and imprecise. The result is an improperly angled hook placement and orientation amendable to all manner of depths, angles, securement, and entry and exit points that may cause improper retention, orientation and lure action which greatly diminishes lure (and hook) effectiveness.

Over the years, anglers and inventors have long agonized over the most effective construction of artificial fishing lures, designed to mimic a live bait, which are capable of roughly accepting a hook and providing (1) an insertion point for hook point entry and/or (2) an engineered, guided pathway or channel for accepting a hook shaft or shank and/or (3) an enhanced means of securement within the guided pathway or channel. Artificial lures, traditionally, though, exhibit an imprecisely placed hook where no reservoir or channel for hook "seating" exists after placement—leading to "offset" placement, at best, and ineffectual, unevenly distributed weight, improper hook angling and unnatural action, at worst. This improper placement lends itself to a lack of utility of construction (and use) that allows for irregular weight distribution, via an inexact placement, leading to erratic and unpredictable lure action, across several different planes (e.g., a lure's sagittal and transverse planes), achieved through various weights and sizes of hooks into a soft plastic fishing lure which provide artificial (as opposed to natural) movements which are unattractive to fish.

And although the concept of types of hook guidance in a soft lure is not sui generis, per se, generalized and rudimentary "slots" or "cavities" to date have been largely positioned on the underside portion of a lure as to ensure the point of the hook is downwardly directed. This "lower-facing" hook profile and embedded under slot placement however allows for an increased probability that the hook will become "snagged" in and on its environment (i.e., weeds and aquatic organic matter) via exposure to a body of water's bottom during use. Moreover, even these elementary areas created for hook placement, lack any means or mode of securing and guiding the hook's barb or shaft once inserted.

To this remedy the threat of snagging, under slot positioned hooks are thereby intentionally shallowly placed, at odd angles, or both, partially or completely concealing the hook within the bottom portion of the body of the lure, lessening the chance of "snags" but also lessening the chance of the hook finding its target—the fish's mouth.

And while the under slot (inferior) position avails the lure itself to snagging on hydrophytes (i.e. submerged aquatic plants), in certain circumstances an inferior-placed hook, utilizing the same or similar inverted chamber and tab placement immediately described—oriented on the inferior portion of a lure—may still nonetheless provide anglers with even a superior configuration to presently available inferiorly placed hooks—especially in terms of guidance, securement and orientation—to better serve users even in the inverted arrangement in certain preferred embodiments.

Although strides have been made to reposition hooks superiorly (and inferiorly) atop and beneath lures as to provide even greater probabilities that snags are avoided (superiorly) or lessened (inferiorly), while also achieving the goal of increasing the probability of catching fish, the presently detailed invention provides modifications and improvements not available in the art. Of note, too, neither any top-positioned hooks nor current underbody placement provide any structured guidance and securement to the angler on the proper positioning and placement of the hook in the lure body either above or below the lure.

The position of a hook within a soft-body lure, as well as historically misconfigured and unsupported top-body as well as bottom-body positioning, wherein the hook is not consistently and predictably guided or fastened for support, is thereby a point of constant frustration for anglers where a hook that is improperly accepted and placed in a lure can have profound effects on both form and function (action) of the lure, up to and including a lure that is either improperly rigged and unbalanced, at best, or completely non-functional and frustrating its purpose, at worst.

Yet, the top slot design that is the primary critical feature of the present invention remedies these infirmities by being comprised of several supportive features which combine to create a superior soft body lure, including: (1) a pliable, semi-solid material section at the head of the lure, (2) a superiorly positioned receiving channel proximate to the lure's dorsal area, and (3) a rearwardly placed chamber tab at the rear wall of the receiving channel, all of which provide a guided reception of an inserted hook through said lure's "nose", at a soft bait's anterior end, into said receiving channel, through an accepting tab (or tabs) wherein said hook is made to reside superiorly above the lure's dorsal area, in line with the lure's sagittal plane (bisecting each lure half into left and right sections), where the hook is centrally disposed within the upper half of the lure's body, where the hook's shaft, bend and point are largely coplanar with this lure's sagittal plane, superior and front-facing and oriented above and in the same direction as the lures "nose". This rectifies the issues of "incorrect" hook placement (improperly angled or deviating from the lure's sagittal plane) but also provides greater utility over those lures having a hook which present inferior to a lure's body. Too, user (self) insertion allows a high degree of interchangeability between hook gauges and designs, the ability to select hooks based on lure size and fish species and the ability to add or remove weight-ladened hooks for enhanced action.

What is more, while the present invention is directed toward an dorsally-placed/superiorly-placed hook, an inverted version of hook placement, along the inferior/ventral portion of the lure, is nonetheless also contemplated by inventor where advantages may nonetheless be achieved over the prior art when directed to a rotation of the hook 180 degrees allowing for front-facing but inferior hook presentation not appearing in the art.

While strides have been made to overcome the inadequacies of improper hook placement through and within soft bait lures, it remains evident that considerable failings remain in artificial lure design and in lure functionality across the industry. It is in light of the above shortcomings, inventor seeks to remediate the deficiencies of previous failed attempts to address the long felt need for a top slot hook chamber for soft plastic baits and method of provision thereof, that adequately serves the need of professional and amateur anglers alike. Too, specific design modifications, their implementation and certain critical features not occurring in the art are as applicable and transferable to inferior hook placement as to superior hook placement for improved hook acceptable, securement and display.

While inventor has set forth the best mode or modes contemplated of carrying out the present invention known to the inventor such to enable a person skilled in the art to practice the present invention, the preferred embodiments are, however, not intended to be limiting, but, on the contrary, are included in a non-limiting sense apt to certain alterations and modifications, based primarily on fish species, lure and hook sizes, within the scope and spirit of the disclosure and appended claims.

SUMMARY OF THE INVENTION

The top slot hook chamber that is the present invention provides for a precisely positionable, positioned and weighted/weight distributed hook placement, superiorly, through and within the top portion of a soft bait lure, achieved with a commensurately-sized fishing hook, which acts to facilitate proper hook placement with a centrally-disposed, properly angled hook orientation that manifests in the exceptional utility and action of the present invention over existing soft bait lures. And while inventor has disclosed the best mode contemplated for achieving the structural and functional elements of a superiorly residing hook barb and point, those skilled in the art will readily appreciate the applicability of advantages of the present superiorly-disposed hook description to a inferiorly-disposed hook description.

In sum, the body of the soft bait lure, as presented, may be made of a pliable material throughout, which may be a plastisol (e.g., polyvinyl chloride (PVC) in a liquid plasticizer up to 70 by weight), or similar vinyl plastics, with the addition of pigments, dyes, glitters or a combination thereof. But inventor further contemplates that those parts or sections that are not designed for accepting of hook insertion and hook securement may be of a solid, semi-solid, semi-plastic, and/or partially plastic or non-plastic material(s). These sections include, but are not limited to, parts of the lure head, top, sides, bottom, tail or any combination thereof. Equally, essentially any portion or section that is non-accepting (or not designed for acceptance) of the hook and hook shaft may themselves be of a pliable or non-pliable material. Yet, ideally, any portion accepting of the hook, or designed for hook acceptance, via the hook's point, and parts of the hook shaft and bend are preferably of a plasticity and rigidity that allows for hook acceptance, insertion, placement and securement with varying amounts of force. Thereby, the materials used in the pliable portion may be of differing consistencies and/or materials as to provide requisite and varying degrees of rigidity and placidity as to find the proper balance between pliability, stiffness, stability, securement and necessitated resistance to address an angler's preference, proper hook insertion, hook securement and maintenance of the hook within the body of the lure during operation.

As represented, the head of the soft plastic lure is solid or semi-sold with dimensions determined by the intended or utilized hook size serving as an anchor point and leading, ultimately, from a soft plastic anterior "nose" portion to a centralized cavity (i.e., slotted chamber), whereby said "nose" serves as both an indicator for the area of initial hook insertion and, an accepting guide for the initial hook point insertion and a primary anchoring point. This solid anchor "nose" thereby may be of several widths, depths, having indentions, demarcations or identifiable profiles, so long as the angler may visually inspect the swimbait for a point of insertion, insert the point of the hook into a lure "head" or "nose" structure, acting as an accepting anchor and guide for a hook, via its hook point, and subsequently into an accepting (slotted) chamber. The chamber itself is defined by a absence of material which creates a void or space for hook acceptance.

The slotted chamber thereby is made to run a designated length and width, largely within the superior (dorsal) portion of a lure, appropriately sized for a hook matching the dimensions of the lure, commensurate with the hook size, wherein the slotted chamber's width and length scales to match the overall dimensions (i.e., scale) of the lure-hook combination.

In addition to the slotted chamber feature, the slotted chamber exhibits a rearward "tab" (i.e., a protrusion) existing at the "rear" of the slotted chamber (distal from the "nose" of the lure and proximate to the area closest to the "tail" or posterior region) acting as a second anchor point (where the solid or semi-solid "head" is the first anchor point) and as a point of attachment to secure the hook within the slotted chamber, properly positioning the hook within the chamber and guiding the hook point and bend, sequentially, for the proper placement of the hook within the lure's slotted chamber. This tab provides the angler with a visual indicator as to the precise location where the hook should exit within the soft plastic lure body to ensure correct placement and rigging. It is to be noted that the thickness (e.g., height and width) of the "tab" is designed to be sufficient to fully envelope the hook's gauge transversely for securing of the hook's bend whereby, just as the chamber's cavity scales with lure and hook sizes, so too will the thickness (and placement) of the tab. It is also noted that one to a plurality of tabs may be positioned at the rear of the chamber wherein tabs may be "stacked" vertically for increased hook-gripping strength, guidance or a combination thereof.

The lure body is preferably constructed through a molding process whereby a slot, channel or cavity is created on the superior side of said soft plastic lure for hook acceptance, capable of guiding and presentation of a fishing hook to and into the chamber correctly. This chamber is typically created in a mold of two mirrored halves wherein the mold exhibits a plate or insertion shaped as a "block" or solid barrier (with allowance for a tab or tabs) of the top slot chamber introduced between the two halves and pliable material is injected into the mold's cavity whereby material is precluded from entering this demarcated space or area. Therefore, the plate is "notched", "blocked" or otherwise "tabbed" to provide a fillable space that results in a tab or protrusion upon lure completion in communication with the lure body. The final result is a space or cavity (herein described as a "top slot hook chamber") created for the acceptance of the hooks bend and shaft exhibiting a congruent tab/protrusion. Of note, the tab itself, or tabs themselves, may be of differing "heights" within the rear of the chamber (i.e., proximate to the dorsal chamber opening versus distal from the dorsal chamber opening) as to facilitate raised or lowered hook presentation, respectively.

The combination of (a) a solid or semi-solid head anchor (b) "open" slotted chamber on top (dorsal portion) of soft plastic lure and (c) rear-chamber disposed accepting tab (at the rear of the chamber) act in concert as a system to provide a guided hook insertion and proper hook placement and angulation within a soft plastic lure. And, while each feature lends itself to proper hook placement, one or more features may be used collectively (a+b+c), singly (a, b, c) or in various combinations (e.g., a+b, a+c, b+c, a+b+c, and the like) as may be chosen, desired or provided. Yet, the combination of a+b+c is contemplated to provide the most utility, wherein b may also be inverted to exhibit an "open" slotted chamber on the inferior (ventral portion) of a soft plastic lure.

Expressly, inventor envisions an insertion "system" whereby, sequentially, a+b+c is utilized for guided hook insertion, securement and proper placement for commercially available hook sizes (e.g., 1/0, 2/0, 3/0 and so on). To wit, hooks that are in the recognized ranges from #32 to 20/0 will be proportionally mated with top slot chambers and lures (or bottom slotted chambers and lures) of an accepting size as to ensure the soft plastic lure is capable of receiving, securing and positioning various and variable hook sizes, thicknesses and gauges (with or without weights).

The present lure is unique in that it incorporates a precisely sized and positioned visible solid anchor point, internally (superiorly or inferiorly residing) chamber and rearwardly disposed accepting tab to create a soft plastic lure with a precisely positioned and positionable hook, inserted therethrough with proper alignment of the hook and hook point angulation and depth as to ensure exact and reproducible placement of said hook within a soft body lure. Precisely, by assuring a precise hook placement and hook to lure size ratio, the lure's action may be achieved more consistently and too modifiable, depending on variations on lure and chamber sizing, as well as material consistency (rigidity to placidity ratio), and tab placement, as to create a hook-accepting lure that itself may be modified but also provide consistency across variations.

Specifically, the present top slot (and bottom slot) chamber may be modified as to materials, weighting and counterweighting to provide consistency, even across differing gauges of hooks, where the present invention combines an engineered relationship between differing placidity's of lure materials, hook gauge/size, weights and differences in angle and position (inherent to the inserted hook or due to "tab" placement) to create a hook and lure arrangement with angler modifiable and "adjustable" actions, predictably and reproducibly which may prove easier for the angler to cast and reel and/or which is a more visually seductive lure to a predator species and thus a more effective lure.

And, inventor is aware, and it is within the contemplation of inventor, that, while a single hook is disclosed within the description and figures, the use of one to a plurality of tabs may be utilized to accept and secure one to a plurality of hooks, superiorly, inferiorly, or a combination thereof, wherein multiple hooks may be inserted into a lure where tab number and arrangement, as well as chamber number and configurations, superior, inferior, or both, may be altered and modified (positioned, repositioned, expanded, enlarged, shrunken, arranged and rearranged) as to accommodate any number of hooks, weighted hooks, arrangements, orientations, or a combination thereof, either above, below or to either side of a properly configured lure.

In addition, the soft plastic lure body itself is capable of any number of forms (e.g., prey fish, crayfish, frog, and the like) with any number of differences in tail structure and paddle configuration and orientation (See FIGS. 9A-9C). As shown and depicted herein, the soft plastic lure of the present invention exhibits a downwardly planning (paddle) tail, including any whip-like (non-tail structure), but this may too be modifiable through the molding process, as to take on any configuration (thus exhibiting different actions) as may be contemplated by inventor and which may be heretofore available in the field or thereafter conceived.

Likewise, the soft plastic lure body, or sections thereof, may be made of soft, semi-soft or hard-to-soft materials, themselves containing different densities and weights, with the inclusion of any number of colors, rattlers, and/or scents, as to provide variations in visual representations and action dependent upon or independent of the hook, including, but not limited to weight, gauge, length, durability, stability, material compression, firmness, pliancy or a combination thereof.

BRIEF DESCRIPTION OF THE DRAWINGS

Advantages and other aspects of the invention will be readily appreciated by those having skill in the art and may be better understood with further reference to the accompanying drawings in which like reference characters designate like or similar elements throughout the several figures of the drawings and wherein.

It should, however, be understood that the above figures and summary are not intended to limit the invention to the particular embodiment or system disclosed, or a mandatory method of use, but on the contrary, the invention disclosure is intended to cover all modifications, alternatives, equivalents, and methods of use thereof, falling within the spirit and scope of the invention as defined within the claim's broadest reasonable interpretation consistent with the specification.

DETAILED DESCRIPTION OF THE PREFERRED EMBODIMENTS

A detailed description of the preferred embodiments of the invention are disclosed and described below. Yet, each and every possible dimension and arrangement, within the limits of the specification, are not disclosed as various permutations are postulated to be in the purview and contemplation of those persons having skill in the art. It is therefore possible for those that have skill in the art to practice the disclosed invention while observing that certain features and spatial arrangements are relative and capable of being amended and adapted, arranged and rearranged at various points about the present invention (by manufacturer or angler) that nonetheless accomplishes the remediation of one or more of the infirmities as outlined and discussed above in the field of artificial soft plastic lure design and use. As well, the soft plastic lure itself (as well as the inserted hook) may be sized (i.e. enlarged or shrunken) so long as the proportions are maintained that allow for maintaining of esthetic appearance and proper functioning of the present invention that has received an inserted hook.

Equally, it should be observed that the present invention can be understood, in terms of both structure and function, from the accompanying disclosure as well as claims taken in context with the associated drawings. And whereas the present invention and method of use are capable of several different embodiments and permutations, which can be modified into several different configurations, each exhibiting accompanying interchangeable functionalities without departing from the scope and spirit of the present application as shown and described.

Figure 1:
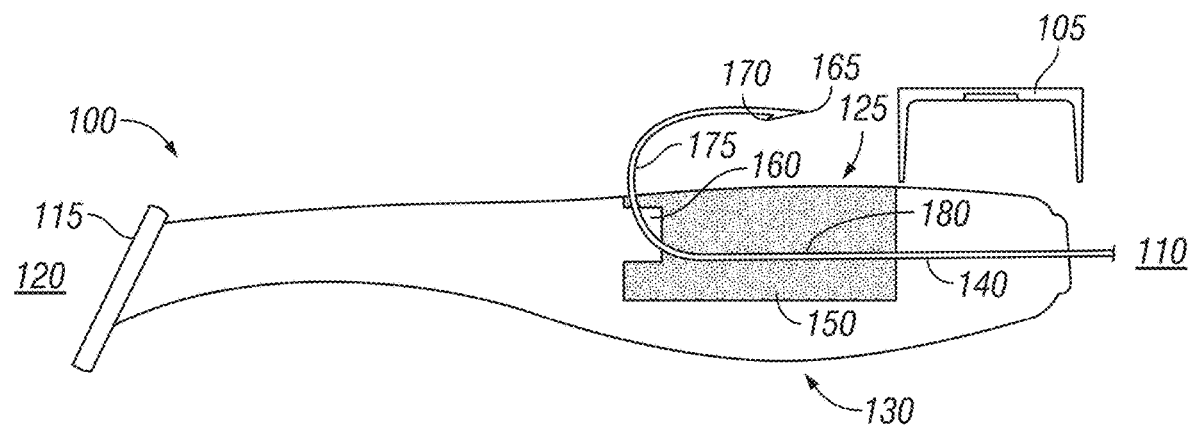
FIG. 1 depicts a representational view of an artificial fishing lure, featuring a chamber and tab, with proper rigging.
Figure 3:
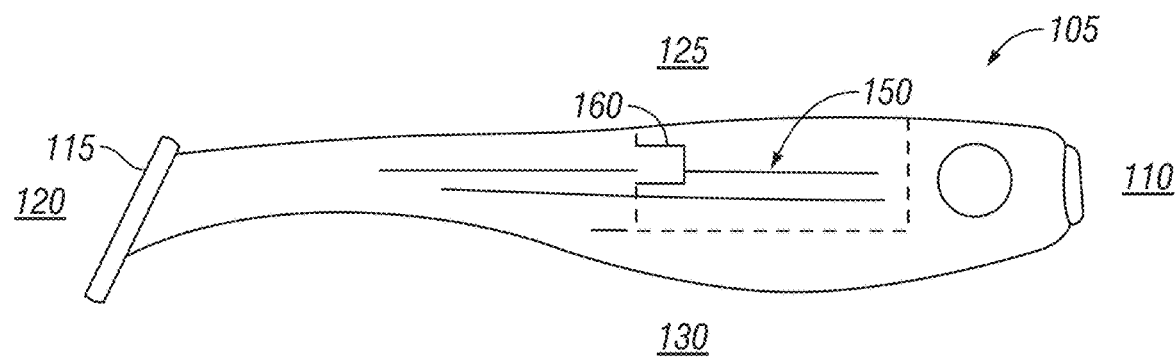
FIG. 3 illustrates a side view of the present invention.

As shown in FIGS. 1 and 3, soft body lure 100 is defined by a solid to semi-solid nose 105 feature at an anterior end 110 and paddle-like structure 115 in a posterior ("tail") region 120 of lure 100. Lure 100 is further defined by a dorsal region 125 superiorly and a ventral region 130 inferiorly. Functionally, in FIG. 1, hook 140 is inserted into nose 105 and into a slotted chamber 150 exhibiting a rearwardly-disposed tab 160 which is made to accept first the hook point 165 and barb 170 then the hook bend 175 as to ensure a largely horizontal hook shaft 180 in relation to the lure 100. The term "largely" defined as within (plus or minus) 10%.

Figure 2:
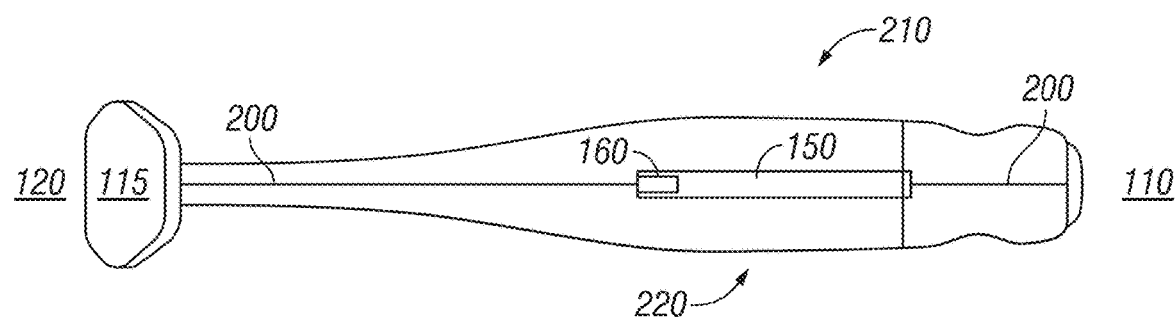
FIG. 2 shows a top view of the present invention.
Figure 4:
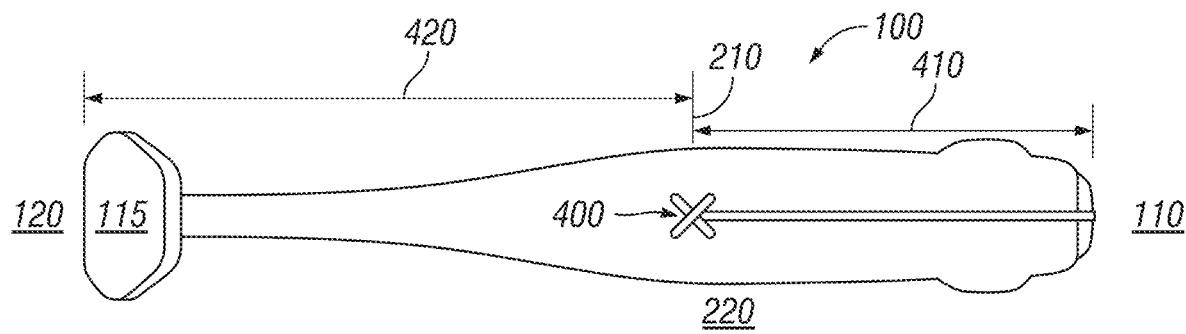
FIG. 4 shows a top, 'correct' point of hook bend insertion and attachment in a lure tab.

From a top angle (FIG. 2), slotted chamber 150 and rearwardly-disposed tab 160 are shown coplanar with the lures sagittal plane 200 wherein slotted chamber 150 is roughly equidistant from the left side 210 and right side 220 of lure 100. The term "roughly" defined as plus or minus 10%. The proper placement of tab 160 is further evidenced in FIG. 4 wherein hook 140 (not shown) is made to communicate with tab 160 at an area signified by 'X' 400 equating with an area wherein hook 140 is made to exit lure 100 at a junction of lure body 410 and lure tail 420.

Figure 5:
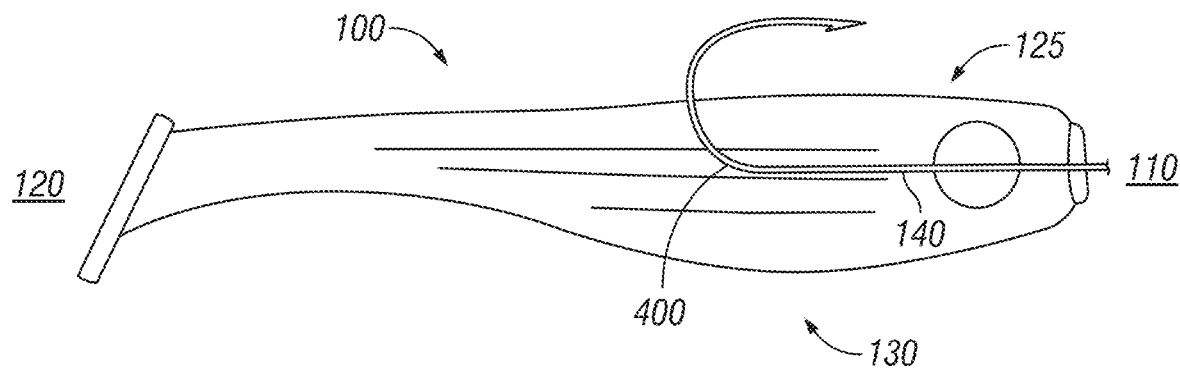
FIG. 5 depicts a properly-placed, inserted hook within a lure.

FIG. 5 is a side view of lure 100 wherein hook 140 is evidenced exiting the lure at position 400 whereby hook 140 is displayed internally and properly positioned.

Figure 6:
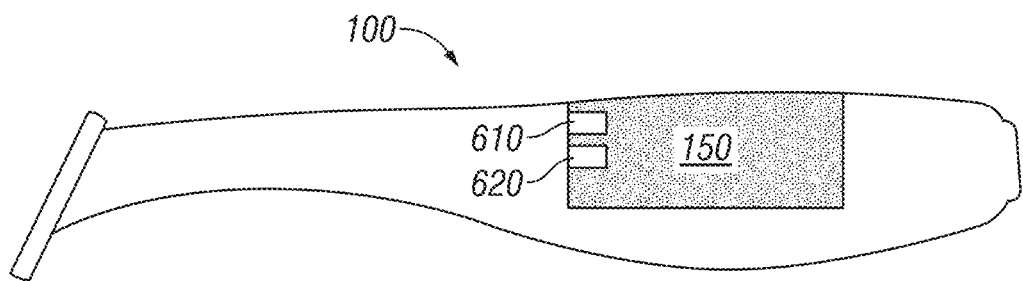
FIG. 6 illustrates two rearwardly disposed tabs within a lure.

FIG. 6 provides an additional preferred embodiment wherein a two tab arrangement (tab 610 and tab 620) are "stacked" vertically within slotted chamber 150 allowing for increased securement, variability of height, multi-hook arrangement, selectability within a single lure, or a combination thereof.

Figure 7:
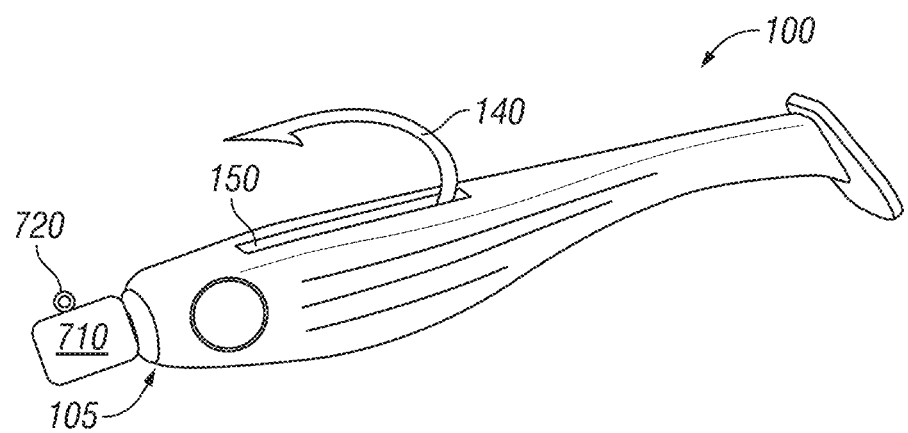
FIG. 7 is a top perspective view of the present invention in a properly rigged lure.

In terms of arrangement, FIG. 7 illustrates proper hook 140 insertion wherein not only is hook 140 disposed above lure 100 but a weighted hook component 710 is shown abutting nose 105 whereby both weighted hook component 710 and eyelet 720 are properly aligned and inserted within slotted chamber 150.

Figure 8A:
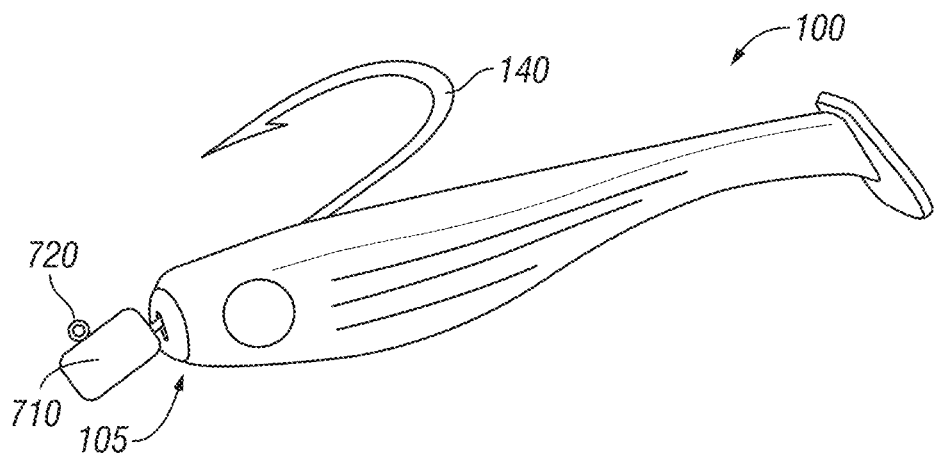
FIGS. 8A and 8B show improperly rigged lures without the aid of chambers.
Figure 8B:
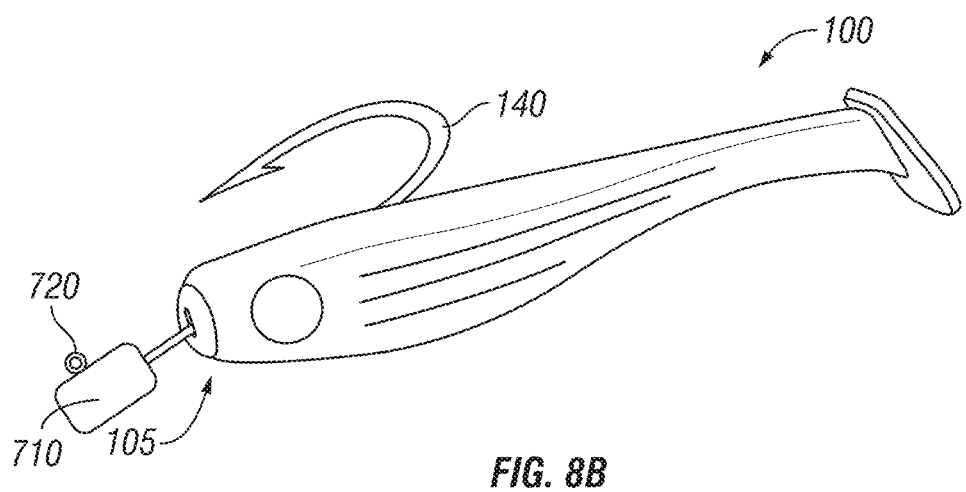

In opposite, FIGS. 8A and 8B both represent prior art lures whereby hook 140 has no dedicated pathway and hook 140 insertion results in hook 140 misalignment, improper rigging, improper weight distribution and skewed eyelet positioning which ultimately result in unnatural lure movement and unpredictable and aberrant lure action.

Figure 9A:
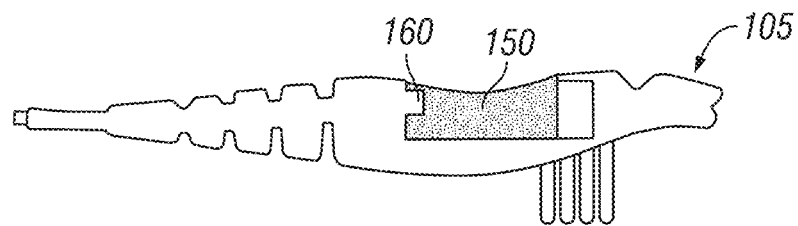
FIGS. 9A-9C depicts the present invention in various lure configurations.
Figure 9B:
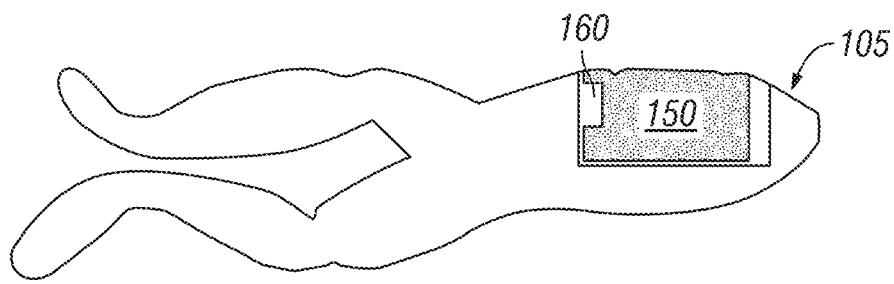
Figure 9C:
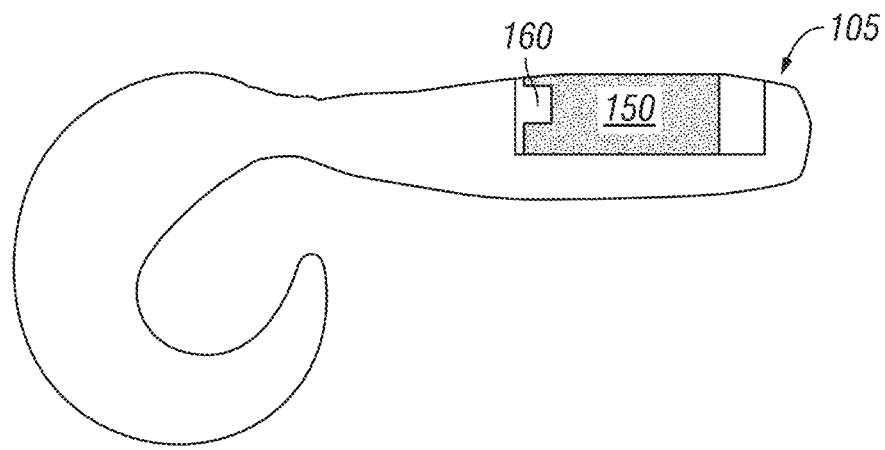

FIGS. 9A-9C demonstrate several lure designs whereby the present invention may be incorporated into lure designs and made to exhibit a three-component system (i.e., incorporating a nose 105, slotted chamber 150 and tab 160 design for hook acceptance) whereby the external feature of the lure may be modified while retaining the same or similar internal structures according to the present disclosure.

Figure 10A:
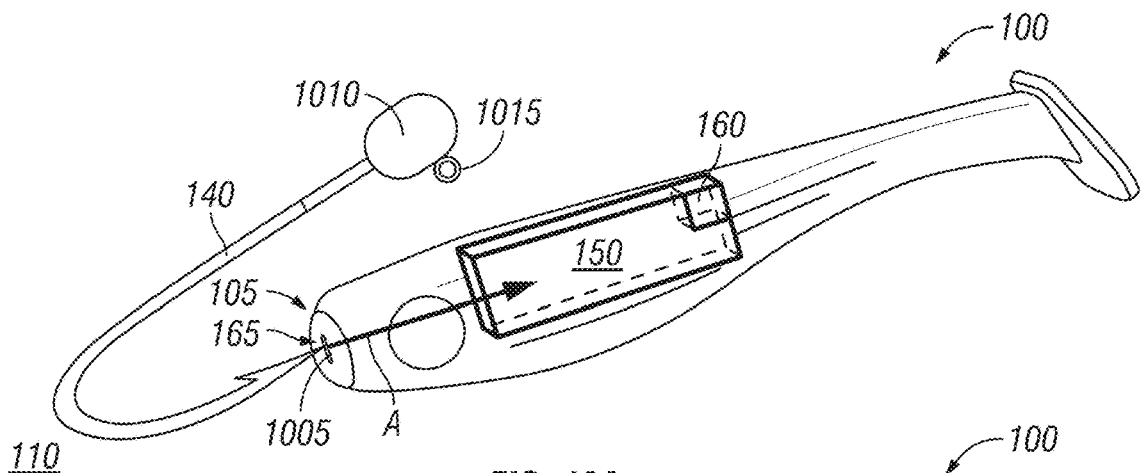
FIGS. 10A-10D illustrate a method of proper insertion and securement of the present invention.
Figure 10B:
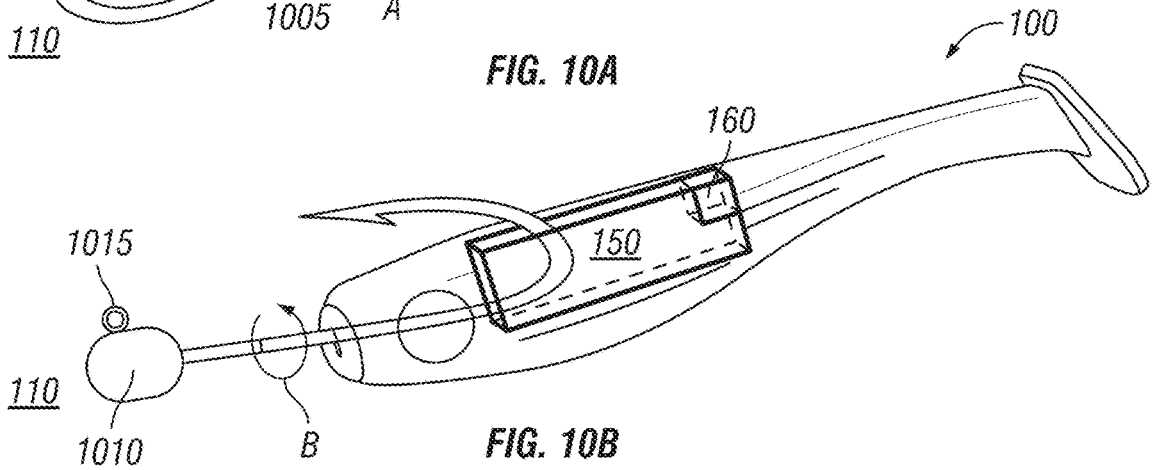
Figure 10C:
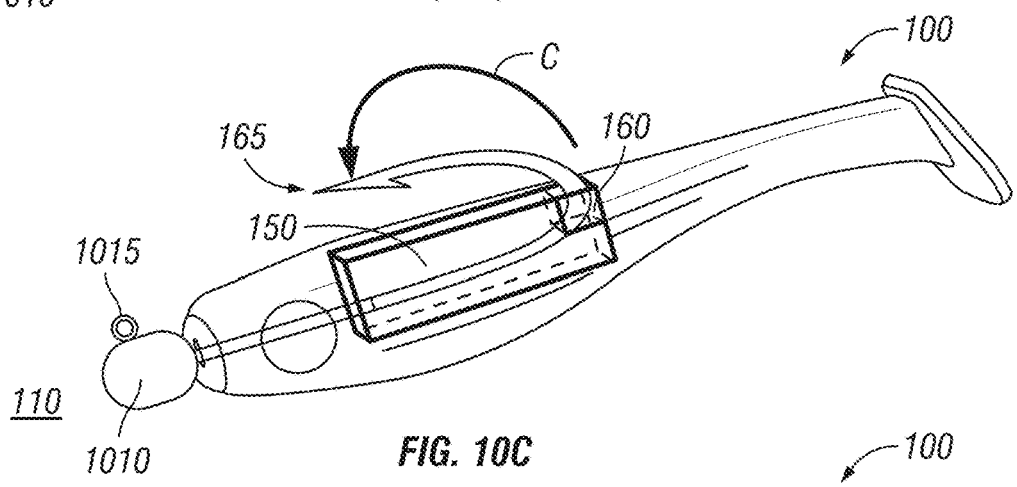
Figure 10D:
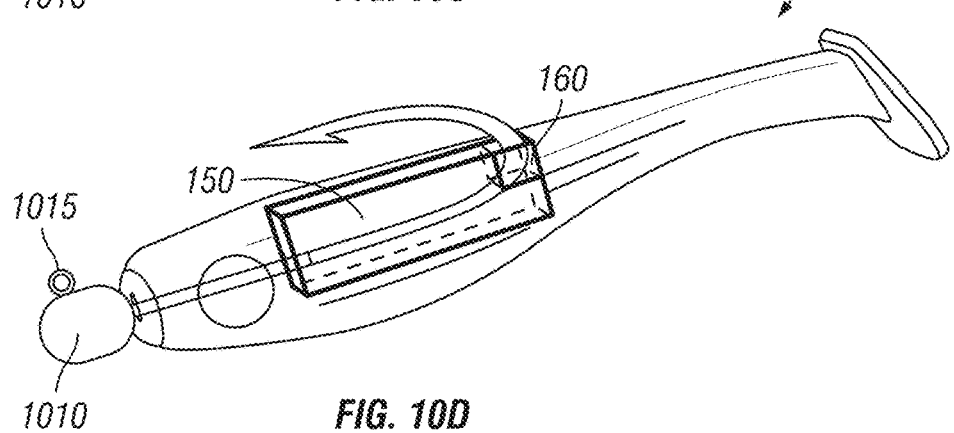

FIGS. 10A-D provide the guided method for hook insertion into lure 100 at the anterior region 110 wherein hook 140 is inserted into the nose 105 of lure 100 at an indented region 1005 via the application of force along Pathway A, via hook point 165, through nose 105 and into slotted chamber 150 (FIG. 10A) whereby hook 140 is then rotated 180 degrees along Pathway B (FIG. 10B). Hook point 165 is then guided to and through tab 160, enters tab 160 (at an inferior portion), exists tab 160 at a superior portion along Pathway C (FIG. 10C) and is thereby stabilized and secured at the rear of slotted chamber 150 where said hook point 165 is then made to face the anterior portion 110 of lure 100 superiorly (FIG. 10D) wherein guided, proper hook 140 insertion, together with correct weight 1010 and eyelet 1015 orientation, is achieved and maintained (FIG. 10D).

Figure 11:
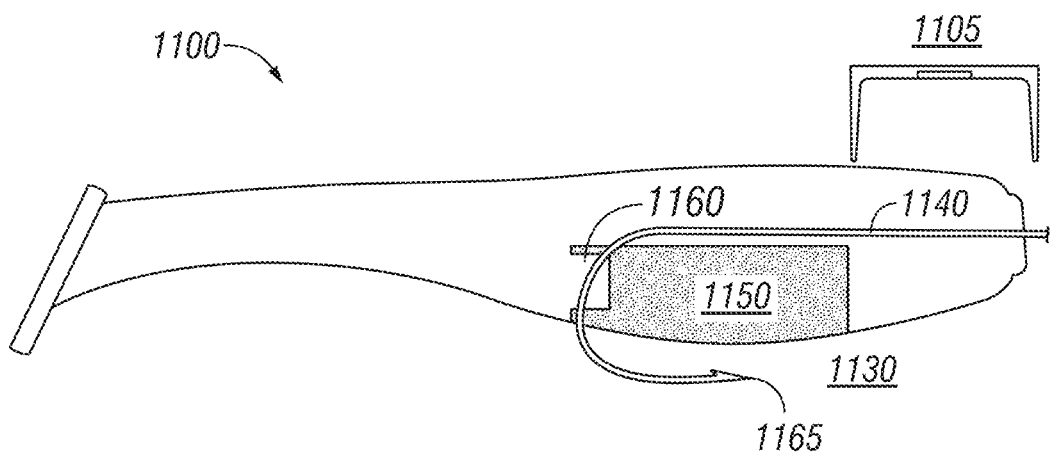
FIG. 11 depicts an inverted chamber configuration.

Alternatively, as in FIG. 11, lure 1100 may be rotated 180 degrees and inserted into an inverted slotted chamber 1150, via hook 1140 insertion into nose 1105, and made to reside inferiorly (along ventral region 1130) wherein hook point 1165 is front-facing but positioned inferior to lure 1100. Additionally, the method for proper hook insertion described in the preceding paragraph and illustrated in FIGS. 10A-D would simply also be inverted and achieved where all operations are rotated 180 degrees or, in the alternative, the lure itself is simply rotated 180 degrees for proper hook 1140 insertion and then lure 1100 would be inverted prior to use.

PREFERRED EMBODIMENTS

A detailed description of the preferred embodiments of the invention is disclosed and described below. Yet, each and every possible feature, within the limits of the specification, are not disclosed as various permutations are postulated to be in the purview and contemplation of those having skill in the art.

In one present embodiment, a hook may be received and embedded into the "head" of the lure, made to run within and through an accepting depression at the lures head, into the lures receiving slotted chamber, securely positioned by an accepting rearwardly placed tab, wherein the hook's point is exhibited superiorly and front-facing and the hook eyelet is displayed at the "nose" of the lure, and the hook point is front-facing and above the head of said lure.

In another present embodiment, a hook may be received and embedded into the "head" of the lure, made to run within and through an accepting depression at the lures head, into the lures receiving slotted chamber, securely positioned by an accepting rearwardly placed tab, wherein the hook's point is exhibited inferiorly and front-facing and the hook eyelet is displayed at the "nose" of the lure, and the hook point is front-facing and below the head of said lure.

In yet another present embodiment, a hook or hooks may be received and embedded into the "head" of the lure, made to run within and through an accepting depression at the lures head, into the lures receiving slotted chamber, securely positioned by an accepting rearwardly placed tab or tabs, wherein the hooks' points are exhibited superiorly, or inferiorly, and front-facing and the hook eyelet or eyelets are displayed at the head of said lure and the hook point is front-facing and below the head of said lure.

In another present embodiment, a hook or hooks may be received and embedded into the "head" of the lure, made to run within and through an accepting depression at the lures head, into the lures receiving slotted chamber, securely positioned by an accepting rearwardly placed tab or tabs, wherein the hooks' points are exhibited superiorly and inferiorly, and front-facing and the hook eyelet or eyelets are displayed at the head of said lure and the hook point is front-facing and both above and below the head (dorsally and ventrally) of said lure's body.

In yet another embodiment, the receiving tab may be a hoop or other like mechanism for an accepting or positioning a hook adjacent to a rear wall.

In another embodiment, the receiving tab may be a set of two tabs wherein each tab, in close proximity to one another or separated, run parallel to the hooks bend and shaft to thereby support either side of the inserted hook's bend.

In another embodiment, the receiving tab may be a set of two tabs wherein each tab, in close proximity to one another or separated, run transverse to the hooks bend and shaft to thereby support either side of the inserted hook's bend In yet another embodiment, a single tab may exist at various heights/depths within the chamber as to provide variable levels of placement and securement whereby the angler may choose from one to a plurality of tab heights for hook bend guidance and securement or as to provide variable heights and corresponding angles of the hook point across various lures selectable by tab position, lure size, hook size, in relation to fish specials, or a combination thereof.

In yet another embodiment, a plurality of tabs may exist at various heights/depths, angulations and various and variable degrees offset from the lures sagittal plane and within the chamber as to provide variable levels and angles of securement whereby the angler may choose from one to a plurality of tabs for hook bend guidance and securement or as to provide variable heights of the hook and corresponding angles of the hook point where the angler may utilize one, two or a plurality of tabs for hook guidance and securement.

In another embodiment, a tab or plurality of tabs may run perpendicular to said hook bend, in a "stacked" or series of tabs as to provide variable heights of a hook above and away from the lure and adjustable angles of the hook point.

In another embodiment, one to a plurality of hooks may be inserted into the lure that is the present invention whereby each one to a plurality of tabs, running parallel or perpendicular to said hook bend, is utilized to accept one to a plurality of hook bends.

In another embodiment, the hard-type portions or components of a lure may be made of a synthetic ABS (Acrylonitrile butadiene styrene) plastic, a bio-plastic, organic materials, naturally derived or other similar "hard" materials and soft-type lure portions or components may be made of TPE (Thermoplastic elastomers) or other like material including polyvinyl chloride (PVC) and polyvinyl alcohol (PVOH) but may also include other soft plastics such as biologically or organic (natural) based soft plastics. And, lures may be constructed of a combination of the above or may exhibit both hard and soft areas or regions.

In yet another embodiment, a hook may manufactured into the head and thorax region of said artificial lure, as is the case in a hard-type lure or soft-type lure, or may be inserted, removed and reinserted, with the same or new hook, as the angler desires, in the case of a soft-type lure. The hook may be "pre-placed" or inserted after purchase, potentially, or removed and replaced or rigged with an angler-selected hook based on need or proclivity.

In yet another preferred embodiment, the disclosed slotted chamber may run along the inferior region of a soft bait lure wherein the inserted hook is rotated 180 degrees from the above described superior placement as to orient the hook's point inferiorly and pointing toward the "nose" of the soft bait lure (See FIG. 11).

In another preferred embodiment, a slotted chamber may exist superior, inferior or both wherein said slotted chamber, or chambers may have one to a plurality of tabs for insertion of a hook or plurality of hooks.

In another preferred embodiment, the superior and inferior chambers and tabs described supra may be rotated 90 degrees and be placed on either side, or both sides of a lure, and made to exhibit one to a plurality of hooks on either side of a lure.

In a preferred method of hook insertion via a slotted chamber and tabbed lure arrangement (system), the following steps are followed comprising:
  inserting within and through the nose of a bait lure a hook point;
  applying force and driving said hook point into said slotted chamber;
  continuing to apply force to said hook shaft or eyelet;
  moving said hook bend through said nose;
  continuing to apply force to said hook through said nose and into said chamber;
  moving said hook through said nose until said shaft enters said lure nose;
  continuing to apply force until said hook bend is proximate to said tab or tabs;
  lowering and adjusting said hook shaft and bend downward until said hook point is in communication with the under portion of one of tab or tabs;
  piercing said tab with said hook point;
  forcing said hook point through said tab or tabs; and
  continuing to apply force to said hook until said shaft is within said nose, said bend is within said tab and said hook point resides superior to said lure and is front-facing.

In yet another preferred method, the opposite may be achieved where a slotted chamber is placed inferiorly with an opening below the lure so that insertion of a hook (at 180 degrees and inverted) results in a hook point that is front-facing but inferior to the lure.

Also, an alternative method to hook insertion wherein the hook point is front-facing and inferior is to invert the lure prior to hook insertion and reinverting said lure prior to use.

The invention claimed is:

1. A fishing lure comprising:
    an anterior head region, a body and a posterior tail region;
        said anterior head region exhibiting a nose for hook insertion;
            said nose being made of a solid or semi-solid material;
        said lure body having a superior, dorsal region and an inferior ventral region;
            said body exhibiting a sagittal place bisecting each lure half from dorsal to ventral regions;
    a slotted chamber exhibiting a rearwardly-disposed tab;
        said body slotted chamber internalized within said lure body, coplanar with said lure's sagittal plane;
        said slotted chamber being closed inferiorly and open along said lure's dorsal region;
        said slotted chamber existing in a region immediately behind said nose and extending to an area of connection between said body and said tail; and
        said rearwardly disposed tab.

2. The fishing lure of claim 1 wherein said nose is made to accept the point of a fishing hook.

3. The fishing lure of claim 2 wherein said nose has an indention, demarcation or identifiable profile for hook insertion.

4. The fishing lure of claim 3 wherein a hook point is inserted into said an indention, demarcation or identifiable profile, into a slotted chamber residing immediately behind said nose, to and through said rearwardly disposed tab and made to exist said slotted chamber, superiorly, where said hook point is front-facing and in line with said lure's sagittal plane.

5. The fishing lure of claim 1 wherein said lure is made of a solid or semi-sold material.

6. The fishing lure of claim 1 wherein said slotted chamber is made to exhibit one to a plurality of tabs.

7. The fishing lure of claim 1 wherein said slotted chamber is closed superiorly and open along said lure's ventral region and is made to display a hook point front-facing and inferiorly.

8. A fishing lure and hook assembly system comprising:
    a fishing lure;
        said fishing lure having as anterior end, a body, a tail, a posterior end, a superior dorsal side and an inferior ventral side;
        said lure exhibiting a solid or semi-solid nose at said anterior end;
    a slotted chamber;
        said slotted chamber disposed within said lure body and immediately behind said nose;
        said slotted chamber made to communicate with said nose anteriorly and said tail posteriorly;
        said slotted chamber being closed ventrally and open dorsally;
    a tab;
        said tab disposed rearwardly at said area of said chamber and said tail communication; and
    a hook;
        said hook having a point, a hook bend, a hook shaft and a hook eyelet;
        said hook point made to enter said lure nose, anteriorly, into and through said slotted chamber, into and through said tab and out of said slotted chamber dorsally wherein said hook eyelet is exhibited anteriorly, said hook shaft is maintained within said nose and said slotted chamber, said hook bend is at least partially secured within said tab and said hook point is maintained front-facing and superior to said lure.

9. The fishing lure and hook assembly system of claim 8 wherein said slotted chamber is made to house one to a plurality of tabs for said hook or hooks insertion.

10. The fishing lure and hook assembly system of claim 9 wherein said tab or tabs are available for hook or hooks insertion within said slotted chamber at varying heights for selectable hook or hooks insertion.

11. The fishing lure and hook assembly system of claim 8 wherein said slotted chamber is closed dorsally and open ventrally, exhibits a tab or tabs and is made to display a hook or hooks front-facing and inferiorly.

12. The fishing lure and hook assembly system of claim 8 wherein said lure is made to exhibit two slotted chambers open both dorsally and ventrally.

13. The fishing lure of claim 12 wherein each chamber of said lure is made to exhibit one to a plurality of hooks.

14. A method of inserting and securing a hook into and within a fishing lure, via a lure and hook assembly system, comprised of:
    a lure;
    said lure having an anterior end, a body, a posterior end, a tail, a superior dorsal side, an inferior ventral side;
        said anterior end having a solid or semi-solid pliable nose;
        said body having a internalized slotted chamber;
            said slotted chamber having a first anterior end, a second posterior end an open superior top and a closed inferior bottom;
            said slotted chamber disposed immediately behind said lure nose;
            said slotted chamber's first anterior end communicating with said nose;
            said slotted chamber's said second anterior end communicating with said lure tail;
            said slotted chamber's said second end exhibiting a tab or tabs;
    a hook;
        said hook having a point, a hook bend, a hook shaft and a hook eyelet;
    insertion and securing of a hook within said lure comprising the steps of:
        inserting within and through the nose of a bait lure said hook point;
        applying force and driving said hook point into said slotted chamber;
        continuing to apply force to said hook;
        moving said hook bend through said nose;
        continuing to apply force to said hook;
        moving said hook through said nose until said shaft enters said lure nose;
        continuing to apply force until said hook bend is proximate to said tab or tabs;
        lowering and adjusting said hook shaft and bend downward until said hook point is in communication with the under portion of one of tab or tabs;
        piercing said tab with said hook point;
        forcing said hook point through said tab or tabs; and
        continuing to apply force to said hook until said shaft is within said nose, said bend is within said tab and said hook point resides superior to said lure and is front-facing.

15. The method described in claim 14 wherein said slotted chamber having a first anterior end, a second posterior end a closed superior top and an open inferior bottom for insertion and securing of a hook within said lure comprising the steps of:
- inserting within and through the nose of a bait lure said hook point;
- applying force and driving said hook point into said slotted chamber;
- continuing to apply force to said hook;
- moving said hook bend through said nose;
- continuing to apply force to said hook;
- moving said hook through said nose until said shaft enters said lure nose;
- continuing to apply force until said hook bend is proximate to said tab or tabs;
- raising and adjusting said hook shaft and bend downward until said hook point is in communication with the upper portion of one of tab or tabs;
- piercing said tab with said hook point;
- forcing said hook point through said tab or tabs; and
- continuing to apply force to said hook until said shaft is within said nose, said bend is within said tab and said hook point resides inferior to said lure and is front-facing.

16. The method described in claim 14 wherein said slotted chamber having a first anterior end, a second posterior end a closed superior top and an open inferior bottom for insertion and securing of a hook within said lure comprising the steps of:
- inverting said lure whereby said lure's superior, dorsal top is inverted with said inferior, ventral bottom;
- inserting within and through the nose of a bait lure said hook point;
- applying force and driving said hook point into said slotted chamber;
- continuing to apply force to said hook;
- moving said hook bend through said nose;
- continuing to apply force to said hook;
- moving said hook through said nose until said shaft enters said lure nose;
- continuing to apply force until said hook bend is proximate to said tab or tabs;
- lowering and adjusting said hook shaft and bend downward until said hook point is in communication with the under portion of one of tab or tabs;
- piercing said tab with said hook point;
- forcing said hook point through said tab or tabs; and
- continuing to apply force to said hook until said shaft is within said nose, said bend is within said tab and said hook point resides superior to said lure and is front-facing;
- reinverting said lure wherein said hook point is front-facing and inferior to said lure.

17. The method of claim 14 wherein said tab or tabs are made to accept one to a plurality of hooks.

* * * * *